United States Patent [19]
Dunn et al.

[11] Patent No.: US 6,169,786 B1
[45] Date of Patent: *Jan. 2, 2001

[54] METHOD FOR ACCOMPLISHING COMPLETE RE-DIAL

[75] Inventors: Peter Dunn, Lincroft; James Kemble, Bridgewater; Gregory Pulz, Somerset; Alan Ira Schwartz, Bridgewater; Barry Shawn Seip, New Providence, all of NJ (US)

[73] Assignee: AT&T Corp, New York, NY (US)

[*] Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

[21] Appl. No.: 08/946,466

[22] Filed: Oct. 7, 1997

Related U.S. Application Data

[60] Provisional application No. 60/039,658, filed on Feb. 28, 1997.

[51] Int. Cl.[7] .................................................... H04M 1/64
[52] U.S. Cl. .......................... 379/88.25; 379/69; 379/209; 379/214
[58] Field of Search .............................. 379/67.1, 88.23, 379/88.24, 88.25, 88.26, 201, 209, 69, 214, 215

[56] References Cited

U.S. PATENT DOCUMENTS

| | | | |
|---|---|---|---|
| 4,866,759 | * | 9/1989 | Riskin ................................ 379/93.27 |
| 4,878,239 | * | 10/1989 | Solomon et al. .................. 379/88.23 |
| 4,930,152 | * | 5/1990 | Miller .................................... 379/214 |
| 5,268,957 | * | 12/1993 | Albrecht .............................. 379/67.1 |
| 5,278,895 | * | 1/1994 | Carlson .............................. 379/88.25 |
| 5,425,091 | * | 6/1995 | Josephs ................................ 379/201 |
| 5,533,100 | * | 7/1996 | Bass et al. ......................... 379/88.06 |
| 5,644,624 | * | 7/1997 | Caldwell ................................ 379/69 |
| 5,646,982 | * | 7/1997 | Hogan et al. ...................... 379/88.22 |
| 5,751,794 | * | 5/1998 | Kugell et al. ...................... 379/88.22 |
| 5,787,150 | * | 7/1998 | Reiman et al. .................... 379/88.12 |
| 5,832,060 | * | 11/1998 | Corlett et al. ..................... 379/88.19 |

OTHER PUBLICATIONS

Elaine Rowland, Super–Intergrated Voicemail, Auto Attendant, ACD, and Enhanced Caller ID, Aug. 1999, p. 26, Teleconnect, vol. 17, Iss. 8.*
Cecila Wessner, FYI, , Oct. 1999, p. 105, Popular Science, vol. 255, Iss. 4.*
Intelligent Networks Messaging Solutions Call Sender with Rebound. Product Information [online]. Lucent Technologies, 2000 [retrieved on Jun. 6, 2000]. Retrrieved from the Internet: <URL:www.lucent.com/IN/ms_csr.html>.*
Merriam–Webster, Merriam–Webster's Collegiate Dictionary, 10th Ed., ISBN 0–87779–709–9, p. 729, 1997.*

* cited by examiner

Primary Examiner—Krista Zele
Assistant Examiner—Roland G. Foster

[57] ABSTRACT

In a method of leaving a message for a calling party in an automatic long-distance re-dialing service where a called party returns a call from the calling party but the calling party does not answer the called party's return call, the method comprises the steps of providing the called party an option of returning the call from the calling party, for example, at the expense of the calling party and prompting the called party to leave a message for the calling party if the calling party does not answer the called party's return call. The apparatus comprises a controller for controlling operation of an announcement(message delivery capability, a dialer, a voice detector/coder and a memory for storing the message from the called party to be delivered to the calling party. The message is delivered upon detecting the calling party's next picking up their receiver or delivery is attempted periodically over a period of time until one means or the other first results in the calling party's receiving the message.

20 Claims, 2 Drawing Sheets

METHOD FOR ACCOMPLISHING COMPLETE RE-DIAL

This application claims priority to U.S. Provisional Application Ser. No. 60/039,658 filed Feb. 28, 1997.

BACKGROUND OF THE INVENTION

1. Technical Field

This invention generally relates to telephone services and, more specifically, to a system and method for allowing a called party to leave a message for a calling party when returning the calling party's original call. Presently, there exists a long-distance re-dialing telephone service which automatically re-dials a long-distance telephone call when a calling party receives a busy or ring-no-answer (RNA). One such service is AT&T's WILSON, a subscription based service which allows the calling party to hang up, attempts to complete a domestic long-distance telephone call by periodically re-dialing the called party and then notifying the calling party when the called party answers. The present invention expands the WILSON service by allowing the called party to leave a message for the calling party if the calling party does not answer the called party's return call.

2. Description of Related Art

Referring to FIG. 1, there is shown a flow diagram of the sequence of events that occur when using the WILSON service. A provisional patent application for WILSON was filed at the United States Patent and Trademark Office on Feb. 28, 1997 and was assigned a Provisional No. 60/039,658 (now U.S. patent application No. 08/959,383. The '658 provisional patent application is hereby incorporated by reference as to its entire contents. WILSON is an extension of AT&T's Dial 1 service and provides a Call Complete function which attempts to complete a long-distance telephone call by periodically re-dialing the called party and then notifying the calling party when the called party has answered and has elected to return the calling party's original call. More specifically, at step 110, party A calls party B and receives a busy or ring no answer (RNA) signal. The busy or RNA signal activates the Call Complete function. The Call Complete function will then attempt to reach party B within a time window, for example, a one hour window, as shown in step 120. At step 130, if party B has not answered within the time window, for example, one hour, then Call Complete is terminated in step 140. If party B answers, then party B is offered an option of returning the call from party A at the expense of party A in step 150. If party B does not elect to return the call from party A, then Call Complete is terminated in step 140. If party B elects to return the call from party A, then WILSON will attempt to reach party A while party B is on the line as shown at step 160. If party A answers in step 170, then both party A and party B are connected as shown in step 180. If party A does not answer, then Call Complete is terminated in step 140 and party B is asked to try the call later.

There also presently exists another service called "True Messaging SM" which permits a calling party to leave a message for a called party such that when the called party picks up their phone to make a new call, the called party is alerted and receives the message that the calling party has left them. It is proposed in the '658 application describing WILSON to interface a leave-a message option with True Messaging service, presumably so the calling party may leave the called party a message as an alternative to the call-back feature described above.

The current WILSON service, however, does not provide the called party with an option to leave a message for the calling party if the calling party is not home or elects not to answer the called party's return call. Therefore, there is a need for a capability for the called party to leave a message for the calling party if the calling party is not home or elects not to answer the called party's return call.

SUMMARY OF THE INVENTION

The present invention provides for a method for leaving a message for a calling party in an automatic long-&stance re-dialing service where a called party finally answers a call, initially receiving a ring-no-answer or busy indication, from the calling party but the original calling party does not answer the called party's return call. The method comprises the steps of providing the called party an option of returning the call from the calling party; and prompting the called party to leave a message for the calling party if the calling party does not answer the called party's return call or the line is busy. The original calling party may pay for the return call or in an alternative embodiment, the called party may pay for the return call in which event the call may be free to the calling party.

The present invention further provides for an apparatus for leaving a message for a calling party in an automatic long-distance re-dialing service where the called party answers a call from the calling party but the calling party does not answer the called party's return call or the line is busy. The apparatus in accordance with the teachings of the present invention comprises means for providing the called party an option of returning the call from the calling party which may be at the expense of the calling party; and means for prompting the called party to leave a message for the calling party if the calling party does not answer the called party's return call or the line is busy.

These and other features of the present invention will become clear from reading the detailed description of the drawings which follows.

DETAILED DESCRIPTION

Figure 1:
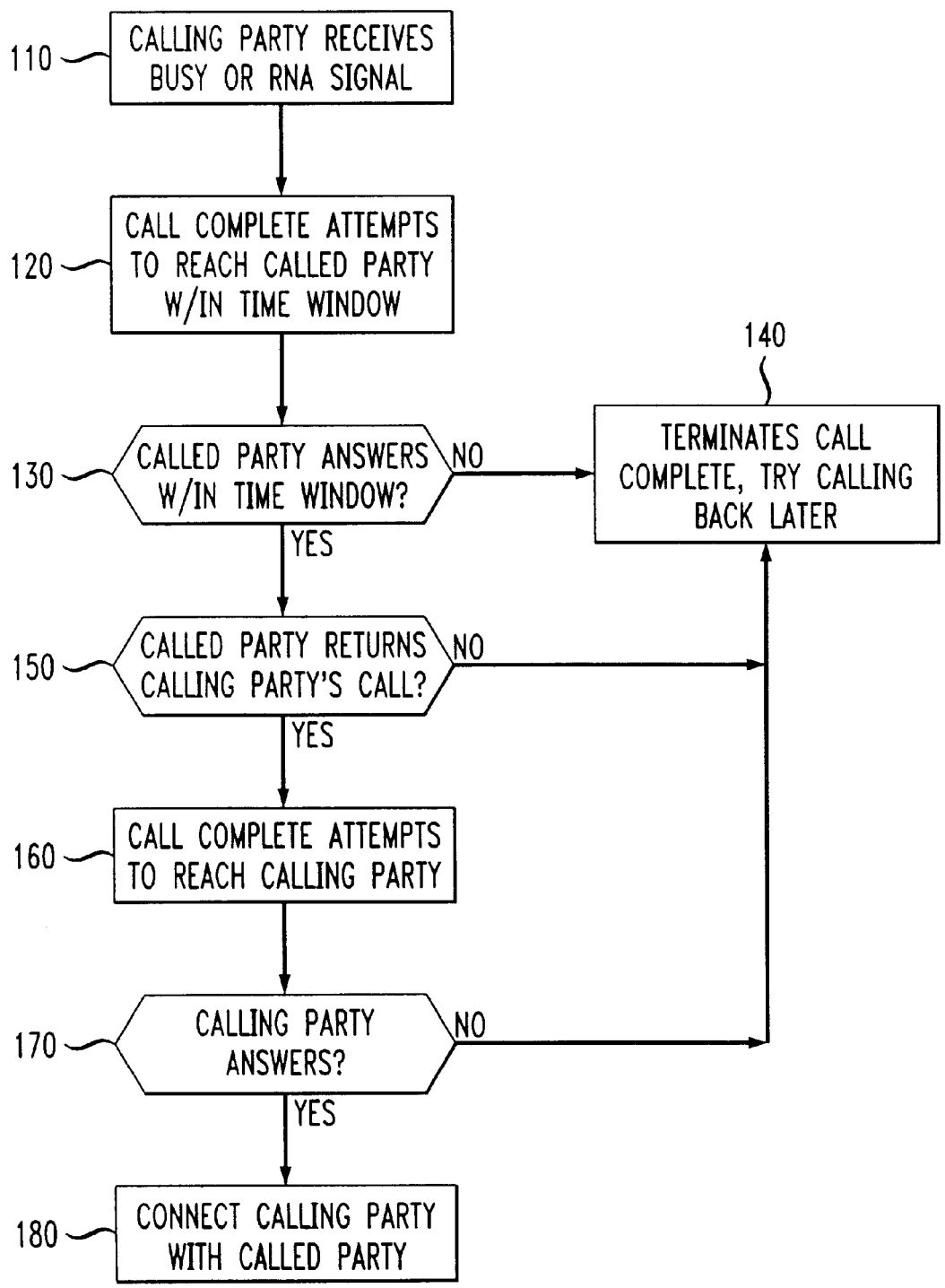
FIG. 1 illustrates a flow diagram of events that occur in the current WILSON service.
Figure 2:
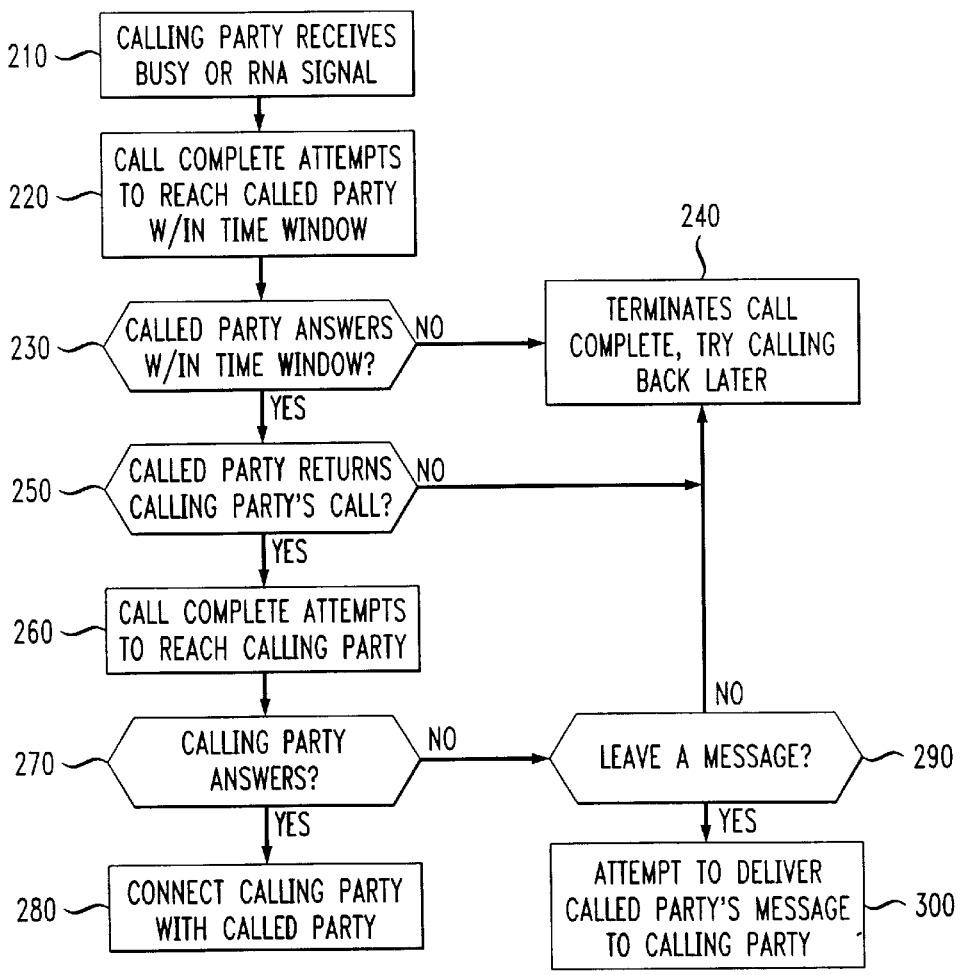
FIG. 2 illustrates a flow diagram of events that occur in the WILSON service in accordance with the teachings of the present invention.

The present invention expands the Call Complete function capability of the current WILSON service. Under the current WILSON service, if a calling party receives a busy or RNA signal when making a long-distance call to a called party, then Call Complete will offer the calling party an option of having WILSON attempt to complete the call by periodically re-dialing the called party and alerting the calling party when the called party answers and elects to return the calling party's original call. With the enhanced WILSON service of the present invention, in addition to the current WILSON capabilities, the Call Complete function further offers the called party an option of leaving a message for the calling party if the calling party is not home, is busy on another call or elects not to answer the called party's return call. For example, message delivery for delivery of a message from the called party to the calling party may occur according to True Messaging when the calling party next picks up the receiver or may be attempted for a ten hour period to the initial calling party via a message delivery platform. FIG. 2 describes the method of offering the called party the opportunity of delivering a message to the calling party, and FIG. 3 provides a block diagram of a message delivery platform for providing the enhanced WILSON service offering.

Figure 3:
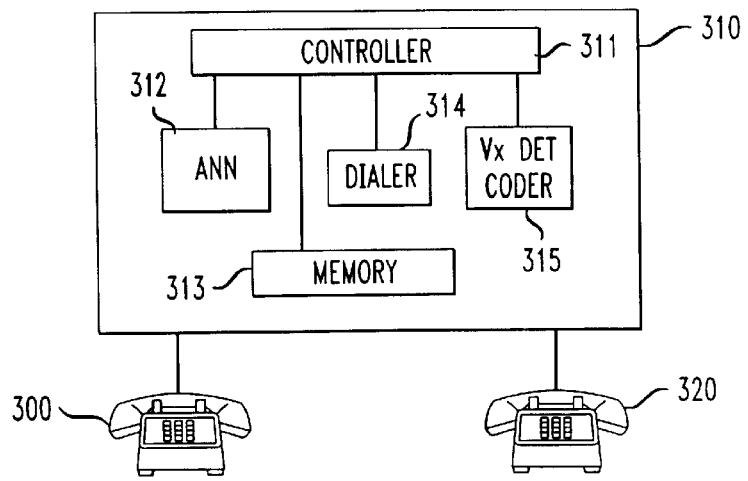
FIG. 3 is a functional block diagram of a message delivery adjunct of the public switched telephone network for providing enhanced WILSON services according to the present invention.

Referring to FIG. 2 with occasional reference to FIG. 3, there is shown a flow diagram of the sequence of events that occur in the implementation of WILSON in accordance with the present invention. At step 210, party A 300 calls party B 320 and receives a busy or RNA signal. This is how WILSON operates presently. The busy or RNA signal activates the Call Complete function. The Call Complete function will then attempt to reach party B within a time window, for example one hour, as shown in step 220. For example, a dialer 314 will call every five minutes until party B answers. Dialer 314 is repetitively activated over the time window trying to reach party B 320, after party A hangs up At step 230, if party B has not answered within the time window, for example, one hour, then Call Complete is terminated as shown in step 240.

If party B finally answers within the time window, then party B is offered an option of returning the call from calling party A at the expense of calling party A or, in an alternative embodiment, at the expense of called party B, as shown in step 250. Through, for example, automatic number identification, the telephone number for calling party 300 is stored in memory 313. For example, in a called party pay situation, called party B may receive an announcement offering a return call service and be billed a nominal fee for the message delivery service/return call which the called party may decline. If party B does not elect to return the call from party A, then Call Complete is terminated as shown in step 240. If party B 320 elects to return the call from party A 300, then WILSON will attempt to reach party A while party B is on the line via dialer 314 and the ANI identified number as shown in step 260. If party A answers, as shown in step 270, then both party A and party B are connected as shown in step 280.

If party A does not answer, is busy or does not have an answering machine for party B to leave a message, then, and further according to the present invention, party B, the original called party, has an option of leaving a message for party A via voice detector and coder 315 which stores a message for delivery in memory 313 to the original calling party, through the WILSON message delivery platform (FIG. 3) as shown in step 290 or terminate the call in step 240. The Wilson delivery platform is most conveniently an adjunct which may be coupled to one of an end office of a local exchange carrier, a tandem office or a toll office of a domestic long distance carrier, for example, the chosen toll carrier for party A 300. Referring briefly to FIG. 3, adjunct 310 is coupled to a calling party 300 and called party 320 via the public switched telephone network. The adjunct comprises a controller 311, an announcement/message delivery capability 312, a memory 313, a dialer 314 and a voice detector and coder 315.

If party B decides to leave a message for party A through the WILSON message platform 310, then WILSON will either deliver the message the next time party A picks up their receiver or will attempt to deliver the message to party A over a time period, for example, over the course of ten hours as shown in step 300. For example, every hour, or other equal time interval, the platform 310 will attempt to deliver the message over the ten hour period.

As an example, a WILSON message delivery platform may provide an announcement at step 290: "We cannot complete the call at this time. For the cost of a one minute long-distance call, you can leave a one minute message (through the WILSON message platform) for party A or hang-up." If party B elects to leave a message, then party B will be prompted with a message such as "At the tone, record your name and a one minute message . . . " (The message duration of one minute may vary depending on memory 313 capacity and implementation of the service). If party B remains silent for a period of time, for example, for 30 seconds, then party B might be prompted with another message such as "We did not understand your response, at the tone, please record a one minute message or hang-up." In order to accomplish this feature, the message delivery platform 310 may be conveniently equipped with a voice or speech detector 315 for distinguishing between speech and silence or background. At step 300, the recorded one minute message is automatically forwarded to party A's (the WILSON's subscriber) messaging mailbox (a service typically offered by a LEC for busy or ring no answer) for subsequent retrieval by party A when they pick up their phone or delivery, for example, every hour over the, for example, ten hour period. Either one or both may be selected by caller B but the successful accomplishment of one must cancel the other. For example, successful delivery to a mailbox for delivery on caller A's picking up their receiver should trigger a message to cancel repetitive message delivery over a time period by the message delivery platform.

Once the called party's message is delivered to the calling party, the calling party may automatically be offered the opportunity to try to reach the called party again. If the called party does not answer, has no answering machine or is busy, the enhanced WILSON service may be offered to the calling party to leave a message for delivery upon called party receiver pick up or over a ten hour period to the called party and so the process may repeat itself.

Besides a message delivery platform of an adjunct as briefly described above comprising at least speech memory, announcement, dialing and speech detection and coding circuitry known in the art, an apparatus for leaving a message for a calling party in an automatic long-distance re-dialing service in accordance with the present invention may comprise an answering machine/dialer, an intelligent telephone, a computer, or other recording device, for example, on the premises of the original called party comprising similar elements or capabilities as shown in FIG. 3.

While the invention has been described in detail with reference to a preferred embodiment and selected variations thereof, it should be apparent to those skilled in the art that many modifications and variations are possible without departure from the scope and spirit of this invention as defined in the appended claims.

We claim:

1. A method of leaving a message for a calling party in an automatic long-distance re-dialing service, comprising the steps of:

providing a called party an option of returning a call to the calling party upon the called party answering a call which initially received a ring no answer or a busy signal;

returning a call to the calling party using message delivery platform;

receiving a ring no answer or busy signal upon the return call to the calling party;

prompting the called party to leave a message for the calling party using the message delivery platform; and when a message is left for the calling party by the called party, receiving said message in the message delivery platform.

2. The method of claim 1, further comprising the step of storing a telephone number for the called party in a memory of said message delivery platform.

3. The method of claim 1, further comprising the steps of receiving automatic number identification for the calling party and storing a telephone number for the calling party in a memory of said message delivery platform.

4. The method of claim 1, further comprising the step of periodically dialing the called number over a time window.

5. The method of claim 4, wherein the time window is one hour.

6. The method of claim 4, wherein said periodically dialing step periodically dials the called number at equal time intervals during the time window until the called party answers.

7. The method of claim 1, further comprising the steps of storing a message from the called party for delivery to the calling party and attempting to deliver the called party's message to the calling party over a time window.

8. The method of claim 7 wherein said attempt to deliver a message over said time window comprises periodic attempts at equal time intervals until the calling party answers.

9. The method of claim 7 wherein said attempt to deliver a message over a time window comprises delivery of a message upon detecting the calling party next picking up their telephone receiver.

10. The method of claim 1, farther comprises the steps of receiving a message from the called party for subsequent delivery to the calling party and charging the calling party for delivering the message during a return call.

11. The method of claim 1, further including the step of providing the calling party an option of returning a call to the called party in response to receiving the message from the called party.

12. An apparatus for leaving a message for a calling party in an automatic long-distance re-dialing service comprising a message delivery platform, said message delivery platform comprising:

means for providing a called party an option of returning call from the calling party, the call initially receiving a ring no answer or busy signal;

means for dialing the calling party a the called party answers the call means for prompting the called party to leave a message for the calling party if the calling party does not answer; and means for receiving a message from the called party for delivery to the calling party.

13. The apparatus of claim 12 further comprises means for storing a called number.

14. The apparatus of claim 12 further comprising means for receiving automatic number identification of a calling party and means for storing said calling party number for redialing.

15. The apparatus of claim 13, flier comprises means for periodically dialing the called number over a time window.

16. The apparatus of claim 15, wherein the time window is one hour.

17. The apparatus of claim 15, wherein said means for periodically dialing dials the called number at equal time intervals during the time window until the called party answers.

18. The apparatus of claim 15 wherein said message delivery platform includes an adjunct and wherein said periodic dialing means comprises a dialer for attempting to deliver the message to the calling party over a time window.

19. The apparatus of claim 17 wherein said dialer periodically attempts to deliver said message at equal time intervals over said time window until the calling party answers.

20. The apparatus of claim 19 further comprising an interface to a local exchange carrier for receiving a signal to cancel said message delivery in the event the message is delivered upon detecting the calling party's next picking up their receiver.

* * * * *